United States Patent
Krone (10) Patent No.: US 9,721,262 B2
(45) Date of Patent: Aug. 1, 2017

(54) SYSTEMS AND METHODS FOR PROVIDING TIME-SENSITIVE COMMUNICATIONS OF TARGETED ADVERTISEMENTS TO MOBILE DEVICES

(76) Inventor: Douglas Krone, Miami Beach, FL (US)

( * ) Notice: Subject to any disclaimer, the term of this patent is extended or adjusted under 35 U.S.C. 154(b) by 0 days.

(21) Appl. No.: 13/446,640

(22) Filed: Apr. 13, 2012

(65) Prior Publication Data
US 2012/0265598 A1    Oct. 18, 2012

Related U.S. Application Data

(60) Provisional application No. 61/474,826, filed on Apr. 13, 2011.

(51) Int. Cl.
*G06Q 30/02*    (2012.01)

(52) U.S. Cl.
CPC .................................. *G06Q 30/02* (2013.01)

(58) Field of Classification Search
None
See application file for complete search history.

(56) References Cited

U.S. PATENT DOCUMENTS

| | | | |
|---|---|---|---|
| 6,795,710 B1 * | 9/2004 | Creemer | 455/456.3 |
| 7,668,832 B2 * | 2/2010 | Yeh et al. | 707/770 |
| 7,729,709 B1 * | 6/2010 | Loeb et al. | 455/456.3 |
| 7,783,532 B2 * | 8/2010 | Hsu et al. | 705/28 |
| 7,827,060 B2 * | 11/2010 | Wright et al. | 705/14.4 |
| 7,848,765 B2 * | 12/2010 | Phillips et al. | 455/456.3 |
| 7,848,949 B1 * | 12/2010 | Delanders et al. | 705/14.49 |
| 7,860,519 B2 * | 12/2010 | Portman et al. | 455/456.3 |
| 7,903,029 B2 * | 3/2011 | Dupray | 342/457 |
| 7,937,724 B2 * | 5/2011 | Clark et al. | 725/35 |
| 7,949,561 B2 * | 5/2011 | Briggs | 705/14.41 |
| 7,991,710 B2 * | 8/2011 | Palatucci et al. | 706/12 |
| 8,014,762 B2 * | 9/2011 | Chmaytelli et al. | 455/414.1 |
| 8,019,700 B2 * | 9/2011 | Provos et al. | 706/12 |
| 8,059,791 B2 * | 11/2011 | Schwartz | 379/88.12 |
| 8,121,898 B2 * | 2/2012 | Altberg et al. | 705/14.73 |
| 8,239,286 B2 * | 8/2012 | Davis et al. | 705/26.7 |
| 8,254,338 B2 * | 8/2012 | Anschutz et al. | 370/332 |
| 8,311,845 B2 * | 11/2012 | Vengroff et al. | 705/1.1 |

(Continued)

FOREIGN PATENT DOCUMENTS

KR    10-2010-0073814    7/2010

OTHER PUBLICATIONS

Kurkovsky, Stan et al., Using ubiquitous computing in interactive mobile marketing Pers. Ubiquit. Comput., vol. 10, 2006.*

(Continued)

*Primary Examiner* — Nadja Chong
(74) *Attorney, Agent, or Firm* — Scherrer Patent & Trademark Law, P.C.; Stephen T. Scherrer; Monique A. Morneault (57) ABSTRACT

Systems and methods of the present invention facilitate the sale of products, such as goods and/or services. Specifically, merchants of products provide incentives for consumers that may be defined by time and geography to drives sales of the products, such as during low demand periods. Moreover, the present invention allows consumers to search for and claim time-sensitive incentives from merchants; specifically, incentives requiring instant or nearly instant acceptance and/or redeemability.

23 Claims, 1 Drawing Sheet

(56) References Cited

U.S. PATENT DOCUMENTS

| | | | |
|---|---|---|---|
| 8,401,897 B1* | 3/2013 | Chatterjee | 705/14.1 |
| 8,489,450 B2* | 7/2013 | Agarwal | 705/14.1 |
| 8,503,995 B2* | 8/2013 | Ramer et al. | 455/414.1 |
| 8,621,536 B1* | 12/2013 | Hendren et al. | 725/104 |
| 8,700,067 B2* | 4/2014 | Shirakawa et al. | 455/456.3 |
| 2001/0014870 A1* | 8/2001 | Saito et al. | 705/14 |
| 2002/0069116 A1* | 6/2002 | Ohashi et al. | 705/26 |
| 2002/0128903 A1* | 9/2002 | Kernahan | 705/14 |
| 2003/0144035 A1* | 7/2003 | Weinblatt et al. | 455/566 |
| 2003/0144913 A1* | 7/2003 | Greenberg | 705/26 |
| 2003/0195670 A1* | 10/2003 | Smith et al. | 701/1 |
| 2005/0187823 A1* | 8/2005 | Howes | 705/14 |
| 2005/0216637 A1 | 9/2005 | Smith et al. | |
| 2005/0222908 A1* | 10/2005 | Altberg et al. | 705/14 |
| 2005/0266858 A1* | 12/2005 | Miller et al. | 455/456.3 |
| 2006/0089878 A1 | 4/2006 | Roberts et al. | |
| 2006/0095329 A1* | 5/2006 | Kim | 705/14 |
| 2006/0178932 A1 | 8/2006 | Lang | |
| 2006/0190330 A1* | 8/2006 | Tollinger et al. | 705/14 |
| 2006/0190331 A1* | 8/2006 | Tollinger et al. | 705/14 |
| 2006/0253453 A1* | 11/2006 | Chmaytelli et al. | 707/10 |
| 2007/0136132 A1* | 6/2007 | Weiser et al. | 705/14 |
| 2007/0203792 A1* | 8/2007 | Rao | 705/14 |
| 2007/0233565 A1* | 10/2007 | Herzog et al. | 705/14 |
| 2007/0233568 A1* | 10/2007 | Pou et al. | 705/14 |
| 2007/0282678 A1 | 12/2007 | Dendi et al. | |
| 2007/0299933 A1* | 12/2007 | Moon | 709/218 |
| 2008/0004926 A1* | 1/2008 | Horvitz et al. | 705/7 |
| 2008/0027814 A1* | 1/2008 | Kulakowski et al. | 705/14 |
| 2008/0091518 A1* | 4/2008 | Eisenson et al. | 705/10 |
| 2008/0102947 A1* | 5/2008 | Hays et al. | 463/31 |
| 2008/0294524 A1* | 11/2008 | Badros et al. | 705/14 |
| 2008/0294548 A1* | 11/2008 | Fowler et al. | 705/39 |
| 2008/0313039 A1* | 12/2008 | Altberg et al. | 705/14 |
| 2009/0006211 A1* | 1/2009 | Perry et al. | 705/14 |
| 2009/0017798 A1* | 1/2009 | Pop | 455/414.1 |
| 2009/0048926 A1* | 2/2009 | Salesky et al. | 705/14 |
| 2009/0112715 A1* | 4/2009 | Steelberg et al. | 705/14 |
| 2009/0138445 A1* | 5/2009 | White et al. | 707/3 |
| 2010/0049609 A1* | 2/2010 | Zhao et al. | 705/14.58 |
| 2010/0121697 A1* | 5/2010 | Lin et al. | 705/14.14 |
| 2010/0131350 A1* | 5/2010 | Yeh et al. | 705/14.41 |
| 2010/0137053 A1* | 6/2010 | Blair et al. | 463/17 |
| 2010/0138299 A1* | 6/2010 | Preston et al. | 705/14.53 |
| 2010/0138303 A1* | 6/2010 | Preston et al. | 705/14.64 |
| 2010/0291907 A1* | 11/2010 | MacNaughtan et al. | 455/414.1 |
| 2010/0312646 A1* | 12/2010 | Gupta et al. | 705/14.58 |
| 2010/0312649 A1* | 12/2010 | Lurie | 705/14.66 |
| 2010/0323716 A1* | 12/2010 | Jaffri | 455/456.1 |
| 2011/0035458 A1* | 2/2011 | Burnim | 709/206 |
| 2011/0223895 A1* | 9/2011 | Wagda et al. | 455/414.2 |
| 2011/0276378 A1* | 11/2011 | Pointer et al. | 705/14.17 |
| 2011/0313859 A1* | 12/2011 | Stillwell et al. | 705/14.58 |
| 2011/0320259 A1* | 12/2011 | Roumeliotis et al. | 705/14.41 |
| 2011/0320275 A1* | 12/2011 | O'Sullivan et al. | 705/14.53 |
| 2012/0016678 A1* | 1/2012 | Gruber et al. | 704/275 |
| 2012/0116858 A1* | 5/2012 | Simmons, Jr. | 705/14.19 |
| 2012/0116884 A1* | 5/2012 | Yeh et al. | 705/14.58 |
| 2012/0150595 A1* | 6/2012 | Kim et al. | 705/14.4 |
| 2012/0158508 A1* | 6/2012 | Kilroy et al. | 705/14.58 |
| 2012/0197720 A1* | 8/2012 | Bezancon et al. | 705/14.53 |
| 2012/0209673 A1* | 8/2012 | Park | 705/14.15 |
| 2012/0220277 A1* | 8/2012 | Gonynor | 455/414.2 |
| 2012/0221389 A1* | 8/2012 | Sharma et al. | 705/14.17 |
| 2012/0245995 A1* | 9/2012 | Chawla | 705/14.45 |
| 2012/0271684 A1* | 10/2012 | Shutter | 705/14.1 |
| 2012/0303438 A1* | 11/2012 | Futty et al. | 705/14.34 |
| 2013/0030918 A1* | 1/2013 | Mourya et al. | 705/14.58 |
| 2013/0041470 A1* | 2/2013 | Morrison et al. | 623/17.16 |
| 2013/0053005 A1* | 2/2013 | Ramer et al. | 455/414.1 |

OTHER PUBLICATIONS

Hristova, Nataliya et al., Ad-me: Wireless Advertising Adapted to the User Location, Device and Emotions Proceedings of the 37th Hawaii International Conference on System Sciences, 2004.*

Mobile Commerce: opportunities and challenges GS1 Mobile Com White Paper, Feb. 2008.*

Dickman, Matt, Mobile marketing 101: Geographic smart-targeting Gooruze.com, Oct. 2007.*

IAM Platform Status Report: A Mobile Advertising Overview Internet Advertising Bureau, Jul. 2008.*

How Mobile Text Alerts and Location Affect Consumer Retail Behavior Placecast, Napean, LLC., Jul. 27, 2010.*

Miller, Claire Cain, Take a Step closer for an Invitation to Shop The New York Times, Feb. 22, 2010.*

International Search Report and Written Opinion for copending PCT Pat. App. No. PCT/US2012/033567.

* cited by examiner

SYSTEMS AND METHODS FOR PROVIDING TIME-SENSITIVE COMMUNICATIONS OF TARGETED ADVERTISEMENTS TO MOBILE DEVICES

The present invention claims priority to U.S. Provisional Application No. 61/474,826, filed on Apr. 13, 2011, which is incorporated herein by reference in its entirety.

TECHNICAL FIELD

The present invention relates to systems and methods for facilitating the sale of goods and/or services. Specifically, the present invention allows a merchant of goods and/or services to provide incentives for consumers that may be defined by time and geography to drive sales of the goods and/or services. Moreover, the present invention allows consumers to search for and claim time-sensitive incentives of merchants.

BACKGROUND

Any market relies on the sale of goods and/or services from merchants to consumers. Of course, a consumer may exchange money for desired goods and/or services. Modern society offers an abundance of choices for consumers. For example, a consumer that may be within a certain geographic area may have many choices about where to eat, where to be entertained, and where to buy goods and/or services.

Merchants typically offer goods and/or services at so-called "brick and mortar" establishments, or stores. For example, restaurants offer goods that typically must be housed within a store, due to the limitations of requiring a kitchen and storage of ingredients. Thus, a restaurant may be anchored to a particular location. Although a restaurant may be franchised, any particular restaurant typically does not have the ability to travel to where demand may be higher at any particular time. Moreover, traveling restaurants may find it difficult to determine where demand may be higher at any particular time. Stores that offer other goods and/or services are typically no different than restaurants in this regard.

When a merchant sells a good and/or a service, there are typically fixed costs for the products of all goods and/or services, and marginal costs, which are generally defined as the cost for producing an additional product, whether a good or a service. Prices tend to be set based on what the market will bear for a particular good or service. Of course, a merchant would generally wish that the price of the product is satisfactory to cover the costs of producing the product. However, the demand for a product can be influenced by a host of factors at any given time. It is typically very difficult for a merchant to set the price in response to any given factor that may influence demand. In many cases, factors that may influence the demand for a product are not typically known until too late by the merchant. Even if known, a merchant typically has little control over short term pricing to respond to the influencing factor on demand.

As noted, a product, whether a good and/or a service, has fixed costs and may have relatively low marginal costs. For example, a seat on an airplane may have relatively high fixed costs, but very low marginal costs. Thus, it is in an airlines best interest to fill to capacity an airplane, because it costs very little extra to fill each seat. Thus, an airline will wish to sell all seats, no matter the price, to minimize losses caused by the fixed costs. However, the airline will still wish to maximize revenue. And, of course, the airline will not wish to offer discounted pricing to those customers that, but for the incentive, would have paid the full price.

In another example, a restaurant typically offers its goods based on its current supply of ingredients. Ingredients have a very limited shelf-life, especially if the restaurant wishes to ensure that the ingredients are as fresh as possible, as fresh ingredients tend to create superior foods. Thus, in many cases, a restaurant may purchase ingredients for its foods on the same day that the restaurant intends to offer the goods to consumers to maximize freshness. Typically, a restaurant must anticipate the potential consumer demand at a certain time, such as on a particular day, and project the ingredients needed for that timeframe. Thus, a restaurant, like an airline, may have relatively high fixed costs, but relatively low marginal costs for producing food for customers. However, oftentimes, for various reasons, a restaurant may have a relatively large amount of ingredients with limited shelf-lives, but may not have the demand needed to sell goods made from the ingredients, causing the ingredients to go to waste.

Other merchants may offer similar products that have limited shelf-lives, or may be time-sensitive in other ways. For example, theaters may offer its products at certain times and on certain days. Thus, when a theater advertises a show, it will run the show whether there are many or few patrons in attendance. Moreover, in many cases, fixed costs may be relatively high, considering that theaters must pay the case, crew, rent, etc. independent of the number of patrons in attendance. However, the marginal costs for servicing patrons may be relatively low. Therefore, a theater would wish to have the ability to maximize revenue by being able to offer seats to patrons at discounted pricing. But again, for maximizing revenue, the theater would not wish to provide discounted pricing to those customers that would have paid full price.

A potential solution for merchants to maximize revenue for products, whether goods or services, having relatively low marginal costs is to offer incentives to drive demand. Mostly, incentives may include coupons or vouchers that may be utilized by consumers at the merchants. To help when demand may be low and supply of products may be relatively high, a merchant may allow coupons and vouchers to be utilized, but only at certain times. However, the merchant must still anticipate well ahead of time when these low-demand times may be, because coupons and vouchers are typically preprinted on paper with the days and/or times applicable directly to the coupons or vouchers. While a merchant may be able to utilize historical data to determine when a low-demand period may be, in many cases, low-demand periods may occur for no apparent reason, or for reasons not anticipated by the merchant.

The internet has helped alleviate the problem of having low demand and/or high supply periods for merchants, especially with products having relatively low marginal costs. For example, the website Restaurant.com offers vouchers that may be purchased by a consumer. Incentives may be provided for the consumer to purchase the coupon. For example, a consumer may purchase a voucher for less than the face value. Typically, the vouchers have time limitations for utilizing the voucher at a merchant. For example, many restaurants offer discounted vouchers that may only be utilized on certain days and/or at certain times. However, the limitations are typically predefined and based simply on historical data when the merchant may know when the slow periods are. However, even if slow periods may be generally known, a merchant may find himself busy during a historical slow period, and a consumer may still wish to utilize the coupon or voucher at that time. Thus, the merchant will have increased its demand at a time period when, for reasons unanticipated by the merchant, the merchant may not require the increase in demand.

Consumers typically have time and money to utilize at merchants. For example, a consumer may desire to eat at a restaurant and/or see a theater show at a particular time due to a consumer's schedule. Oftentimes, consumers are sensitive to price. For example, consumers may make decisions on how to spend their money based on perceived value. Thus, consumers may be more apt to purchase goods and/or services from a merchant that offers a discount to the consumers. Oftentimes, consumers utilize preprinted coupons and vouchers, but coupons and/or vouchers may be difficult to find, especially when needed. Oftentimes, consumers do not decide to attend a particular restaurant or see a theater show until they are ready to leave the house. Oftentimes, a consumer may already have left his or her house without knowing where he or she is going, and may be undecided about where to go to spend his or her money. Thus, it may be difficult for a consumer to find or utilize a coupon or a voucher without planning for the excursion well ahead of time.

Consumers also generally respond to larger incentives if they must travel over a large geographic area. For example, a consumer that may be located a relatively large geographical distance from a merchant may value a relatively large discount higher than a consumer that is a relatively small geographical distance from the merchant. For example, a consumer may drive a half hour to attend a restaurant if he or she is assured of obtaining a 50% discount on the meal. However, the same consumer may not drive the same distance if he or she is only assured of obtaining a 30% discount on the meal. Of course, a merchant may not wish to offer a discount to a consumer that is already presently within the store of the merchant, since a consumer that is already present is oftentimes more likely to purchase goods and/or service than a consumer that is a geographical distance away from the store.

Thus, a need exists for systems and methods allowing merchants to offer incentives to consumers to purchase goods and/or services at low-demand periods. Specifically, a need exists for systems and methods allowing merchants having products, whether goods and/or services, having relatively low marginal costs, for example, to increase demand during periods of low demand.

Moreover, a need exists for systems and methods allowing merchants to define discounts to consumers based on geographical distance to the merchant's store. In addition, a need exists for systems and methods allowing merchants to increase demand at low-demand periods and define discounts to consumers based on geographical distance to the merchant's store.

Further, a need exists for systems and methods allowing consumers to search for time-sensitive discounts that may be immediately utilized by the consumer to help the consumers make decisions on where and how to spend their money. Still further, a need exists for systems and methods allowing consumers to utilize their location-specific information, based on their portable electronic devices, to obtain discounts based on their geographic location.

Moreover, a need exists for systems and methods allowing merchants to target discounts, coupons, and/or vouchers to consumers and/or potential consumers based on vector-based targeting if the consumer is mobile. In addition, a need exists for systems and methods allowing merchants to target discounts, coupons and/or vouchers to consumers and/or potential consumers based on historical path-based targeting.

SUMMARY OF THE INVENTION

The present invention relates to systems and methods for facilitating the sale of products, whether goods and/or services. Specifically, the present invention allows a merchant of goods and/or services to provide incentives for consumers that may be defined by time and geography to drive sales of the goods and/or services. Moreover, the present invention allows consumers to search for and claim time-sensitive incentives of merchants; specifically, incentives requiring instant or nearly instant acceptance and/or redeemability.

To this end, in an embodiment of the present invention, a method for facilitating the sale of goods and/or services via incentives is provided. The method comprises the steps of: providing an incentive from a merchant, wherein the incentive has a value and an expiry; distributing the incentive to at least one consumer either automatically or manually; and providing an option for acceptance of the incentive by the consumer. Further, the incentive is distributed to consumers in a defined geographical area.

Thus, it is an object and advantage of the present invention to provide systems and methods allowing merchants to offer incentives to consumers to purchase goods and/or services at low-demand periods.

Specifically, it is an object and advantage of the present invention to provide systems and methods allowing merchants having time-sensitive goods and/or services to increase demand during periods of low demand.

Moreover, it is an object and advantage of the present invention to provide systems and methods allowing merchants to define discounts to consumers based on geographical distance to the merchant's store.

In addition, it is an object and advantage of the present invention to provide systems and methods allowing merchants to increase demand at low-demand periods and define discounts to consumers based on geographical distance to the merchant's store.

Further, it is an object and advantage of the present invention to provide systems and methods allowing consumers to search for time-sensitive discounts that may be immediately utilized by the consumer to help the consumers make decisions on where and how to spend their money.

Still further, it is an object and advantage of the present invention to provide systems and methods allowing consumers to utilize their location-specific information, based on their portable electronic devices, to obtain discounts based on their geographic location.

Moreover, it is an object and advantage of the present invention to provide systems and methods allowing merchants to target discounts, coupons, and/or vouchers to consumers and/or potential consumers based on vector-based targeting if the consumer is mobile.

In addition, it is an object and advantage of the present invention to provide systems and methods allowing merchants to target discounts, coupons and/or vouchers to consumers and/or potential consumers based on historical path-based targeting.

Additional features, objects, and advantages of the present invention are described in, and will be apparent from, the detailed description of the presently preferred embodiments and from the drawings.

BRIEF DESCRIPTION OF THE FIGURES

The drawing figures depict one or more implementations in accord with the present concepts, by way of example only.

DETAILED DESCRIPTION OF THE PRESENTLY PREFERRED EMBODIMENTS

The present invention relates to systems and methods for facilitating the sale of products, whether goods and/or services. Specifically, the present invention allows a merchant of goods and/or services to provide incentives for consumers that may be defined by time and geography to drives sales of the goods and/or services. Moreover, the present invention allows consumers to search for and claim time-sensitive incentives of merchants; specifically, incentives requiring instant or nearly instant acceptance and/or redeemability.

Figure 1:
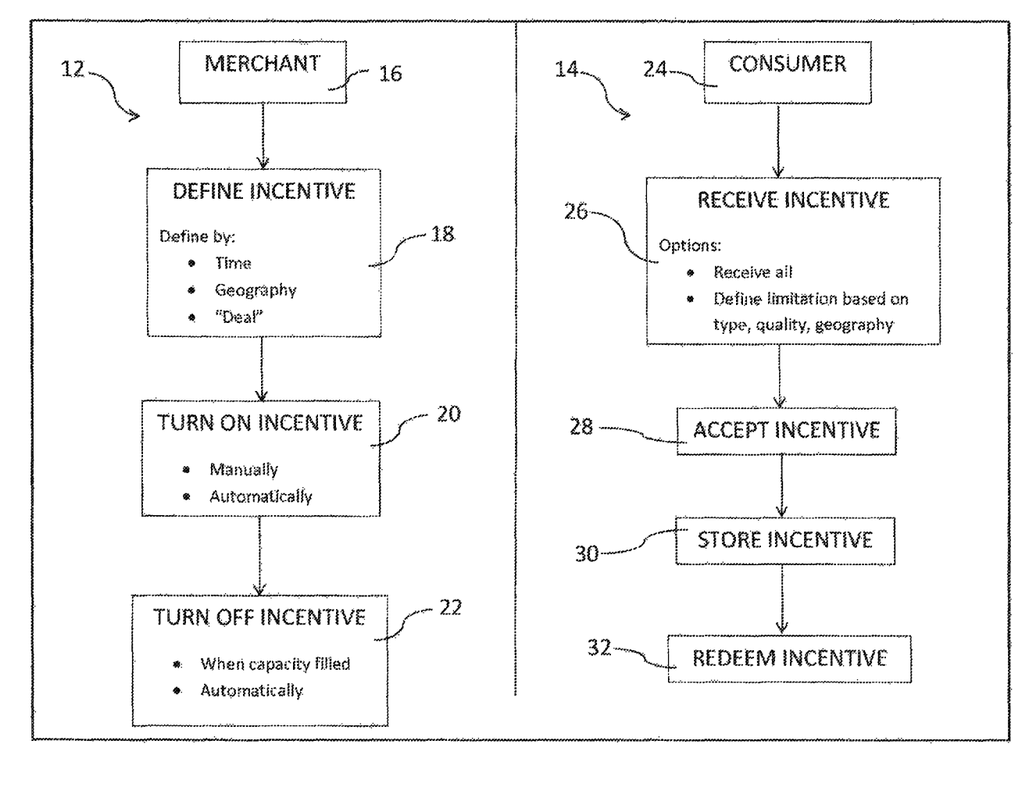
FIG. 1 illustrates an overview of the systems and methodology of the present invention showing a merchant side and a consumer side, in an embodiment of the present invention.

Referring now to FIG. 1, an overview of a system 10 is presented, showing, generally, a merchant side 12 and a consumer side 14. The system 10, as illustrated in FIG. 1, provides a general description of the present invention, and how a merchant may utilize the present invention to provide incentives to fill capacity in his or her store when necessary, and how a consumer may utilize the present invention to receive incentives that may benefit the consumer. Generally, a merchant 16 may have a store and may desire to attract consumers to the store. Specifically, a merchant may be any business or organization that may offer goods and/or services, typically in exchange for money. For example, the merchant may be a restaurant owner or manager and the store may be a restaurant. Alternatively, the merchant may be a theater owner or manager and the store may be a theater. Preferably, the merchant may provide a good and/or a service that has relatively low marginal costs, but may wish to maximize revenue for the sale of the goods and/or services.

For example, the merchant may sell a product, such as a good (such as food or a meal) or a service (such as a theater production), and the product may be time sensitive, in that the merchant may wish to sell the product by a certain time (such as a food for freshness or a theater seat for a particular show). Specifically, the merchant may be a restaurant owner and the store may be a restaurant, and the restaurant may have ingredients for the preparation of food that may require utilization by a particular time for maximum freshness of the food. Thus, a restaurant owner may desire to have as full capacity as possible to sell food preparations at a particular time, such as each day, or in the evening, because the ingredients will not be useful at any other time. Thus, a restaurant owner may be willing to provide discounts for food to utilize the ingredients prior to spoilage to maximize profits.

Moreover, utilizing the theater example above, the merchant may be a theater owner or theater manager, and the store may be a theater. The theater may provide entertainment services that are fixed in time, such as performance dates and times. Thus, the costs for presenting the performance may be relatively high, yet the marginal costs for a customer to attend the performance may be relatively low, and the merchant may wish to maximize revenue by ensuring that the theater is at or near full capacity, even if the theater owner must offer entry to patrons at a discount.

Moreover, the merchant may generally wish to offer incentives if the product will otherwise go unsold at normal or full prices. Relatedly, the merchant would not wish to offer a discount or an incentive to a consumer that intends to pay full price. For example, a merchant may price a product for $100, and the product may have a marginal cost of $40. Of course, the merchant would wish that a customer would pay $100 for the product. However, in a period of low demand, a customer may only be willing to pay $45 for the product. The merchant would wish to accept $45 for the product, because the merchant would realize a profit of $5, whereas the merchant would not realize any profit if the product remained unsold. However, the merchant would not wish to offer $45 for the product to a customer that would have paid $100 for the product. The present invention allows a merchant to define offers or incentives to drive demand, but may discriminate the customers that would pay higher or accept lesser incentives.

The merchant may utilize the present invention to define an incentive via step 18. An incentive may typically be a coupon, promotion, voucher, or other mechanism for providing a discount to a consumer for purchasing goods and/or services at the merchant's store. Preferably, the merchant may login to a website, for example, and, preferably, after authentication of the merchant's security credentials, may define the incentive to attract consumers to the merchant's store, as will be described below in greater detail. More specifically, the incentive may be defined by "time", "geography," and by the "deal" (or the "value" of the incentive). When an incentive is defined by "time," the merchant may specify when the incentive may be applicable. Preferably, the incentive may be redeemable immediately by a consumer or nearly immediately, ensuring that the consumer utilizes the incentive at the time that the merchant wishes, but also at times of low demand. Specifically, in many cases and for any number of reasons, a store may experience a lull, whereby the merchant may have a maximum of lost revenue due to low demand and high fixed costs. Thus, a merchant may define an incentive at that time of low demand to draw consumers into the store at that time, or soon thereafter.

It should be noted that the systems of the present invention, whether utilized by a merchant or a consumer, may be implemented on any computing device that may allow the functionality described herein. For example, a merchant and/or a consumer may utilize the system of the present invention using a desktop, laptop or tablet computer that has internet access and the ability to send messages to consumers, as described herein. Alternatively, the merchant may use an electronic mobile device, such as a cellular telephone, an iPhone, a Blackberry device, an Android device, a Windows phone, or any other electronic device apparent to one of ordinary skill in the art.

In addition, the merchant may define the incentive by "geography." Specifically, a merchant may wish to attract consumers to the store from a particular geographical location. For example, the merchant may wish to attract consumers that are already relatively near the store, so may define that only consumers that are within a certain geographical distance to the store are notified of the incentive. Alternatively, the merchant may wish to attract consumers from a further distance. As will be described below in more detail, consumers that wish to receive the incentives may allow the system of the present invention to track their location via their portable electronic device, such as, for example, via cellular telephone technology or via GPS technology. Thus, a merchant may be able to define an incentive by the actual geographical location of a consumer.

Moreover, the present invention may allow a merchant to discriminate between customers located in different geographical regions. For example, the merchant may wish to send an incentive to potential customers that are presently not in the store already, presumably because customers that are already within the store are likely to pay full price or a higher price than what is offered in the incentive. In addition, as will be discussed in further detail below, a merchant may wish to offer larger incentives to potential customers that are greater physical distances from the store.

In addition, the merchant may define the incentive to target consumers or potential consumers based on their direction of travel while mobile in so-called "vector-based" targeting. More specifically, a consumer or potential consumer of a product and/or service may be more likely to be attracted to an incentive for a merchant if the consumer or potential consumer is traveling in a direction toward the merchant or otherwise to within a particular area. Alternatively, a consumer or potential consumer of a product and/or service may be less likely to be attracted to an incentive for a merchant if the consumer or potential consumer is traveling in a direction away from the merchant or otherwise away from a particular area. In addition, the merchant may have the ability to define different incentives to those that are traveling toward the merchant or a particular area and to those that are traveling away from the merchant or a particular area. For example, the merchant may define a larger incentive to a consumer or potential consumer traveling away from the merchant or particular area than a consumer or potential consumer traveling toward the merchant or particular area.

The merchant may further have the ability to define incentives and apply the incentives to consumers or potential consumers based on their historical path of travel. Because the systems and methods of the present invention may have the ability to determine geographic location information of a consumer or potential consumer, the systems and methods of the present invention may track and store historical paths of travel of the consumer or potential consumer. Thus, it may be determined that a consumer or potential consumer that may historically travel on a particular route may be more or less likely to take advantage of the incentive defined by the merchant. The merchant may define the incentives appropriately based on the historical path of travel information.

The merchant itself may not be in a fixed location geographically, and may travel about a particular area or region. Therefore, the merchant may combine both the geographical information of the merchant and information concerning the consumer or potential consumer to define incentives.

The merchant may further define the incentive based on the incentive itself, known as the "deal" or the value of the incentive. Preferably, the merchant may define the incentive as a percentage discount on the sale of goods and/or services. Moreover, the deal may be defined in terms of a flat fee that may be removed from a total when the consumer purchases goods and/or services. The incentive may further be defined as being tiered, such that the incentive may have a discount defined by the amount purchased, such as a higher discount for more purchased. Other limitations may be placed on the incentives, such as how many people the deal may be applicable to in a party, or other like limitations.

Alternatively, the incentive deal may be combined with a "time" component and/or a "geography" component, as defined above. Specifically, for a deal to be combined with a time component, the definition of the deal may be tied to when the consumer may redeem the deal. For example, a merchant may wish to preferably attract consumers to his or her store within an hour, but may be willing to also accept consumers after an hour. Thus, the merchant may specify that the deal is greater if the consumer arrives and redeems within the hour, but the deal may be less if the consumer arrives and redeems the incentive after an hour.

Moreover, as noted above, the incentive "deal" may be combined with a "geography" component. For a deal to be combined with a geography component, the merchant may desire to attract consumers to the store, but maybe willing to give consumers who are further away a larger discount than consumers that are relatively near. Specifically, consumers may be willing to travel larger distances for larger discounts, and the merchant may be interested in attracting consumers from a larger geographical area, but may not wish to offer higher discounts to consumers that are relatively near the store that may be more willing to come to the store if they received a lower discount. For example, a merchant may provide a discount, such as a 30% discount, to consumers that may be relatively near, such as within 5 miles of the store, but the merchant may provide a higher discount, such as a 50% discount to consumers that are greater than 10 miles from the store.

Further, as noted, the merchant may also define that the deal may not be sent to or otherwise received by a consumer that is already within or likely within the store, because a consumer that is already present is more likely to purchase goods and/or services without any discounts. For example, if a consumer is at a restaurant and is already sitting awaiting food, then the consumer is almost assuredly going to consume and pay for the food, so a discount for that consumer is unnecessary as demand is not increased by providing any discount to that consumer.

Once the incentive is defined, the merchant may then "turn on" the incentive via step 20. By turning on the incentive, the incentive may be sent out or otherwise broadcast to consumers via, preferably, the internet or via cellular transmission, such as by instant messaging via text or any other communication means known to those of ordinary skill in the art. Thus, when turned on via step 20, those consumers having the ability to receive the incentive may receive the incentive at their actual location via their personal electronic device, such as their portable telephone. As noted above, the incentive may be defined based on geography, and if the incentive is defined in terms of a consumer's geographical location, then the incentive may only be sent to those consumers that are presently within the geographical location at the time of the broadcast. Thus, the merchant may have the ability to "push" the incentive to consumers when a merchant turns the incentive on. As will be detailed below, the consumer may also have the ability to "pull" the incentive, by requesting incentives that may be "turned on" during any particular time period in any geographical region.

The merchant may therefore have the additional ability to control the time of distribution of the incentive by defining precisely when the incentive may be distributed. For example, if an incentive is defined as being submitted during periods of typically low patronage of the store, then the incentive may be automatically sent out or otherwise "turned on" during those predefined times. Alternatively, the incentive may be turned on manually at any time that the merchant wishes to attract consumers to the store. Thus, the incentive may not be sent automatically, but when the merchant decides or otherwise determines that there is low demand. This may be useful if the store has a lull that is unanticipated, and the merchant wishes to attract consumers immediately or over a short period of time. Alternatively, the incentive may be submitted both based on predefined times and also when the merchant manually decides to submit the incentive. Thus, incentives, as described herein, may generally be offered to consumers who may then be provided with a very short time frame for accepting the incentive. Generally, a consumer may be required to accept the offer instantaneously (such as immediately upon receipt), or nearly instantaneously, such as within a very short time frame.

The incentive may then be "turned off" via step 22 to stop submitting the incentive to consumers. For example, if the incentive is defined to be sent out during particular predefined time periods, then the incentive may not be sent out once that time period has elapsed. For example, if a restaurant owner knows that the restaurant faces a lull at the same time each day, then the merchant may define that the incentive be submitted during the time period of the lull, and be turned off when the lull traditionally ends. Alternatively, the incentive may be turned off when a predefined number of incentives are "claimed" or accepted by consumers. Specifically, as will be detailed below, when a consumer receives an incentive deal from a merchant, the consumer may decide to accept the incentive, and may be required to redeem the incentive within a certain period of time. A merchant, therefore, may have the ability to define the number of deals that may be accepted by consumers, and the incentive submission may be automatically turned off when the number of deals accepted by consumers has been reached. Alternatively, the merchant may manually turn off the deal if the merchant sees or otherwise believes that the incentive is no longer required.

The consumer side 14 of the present invention allows a consumer 24 to receive incentives, as illustrated in step 26. As noted above, if the consumer receives the incentive, then the consumer is of a class predefined by the merchant, such as within a certain geographical range defined by the merchant. However, the consumer may also be provided the ability to define whether to receive incentives from the merchants. For example, if the consumer wishes to receive incentives from merchants, the consumer may turn on his or her reception of the incentives. For example, the reception of the incentives may be received via an application on the consumers' portable electronic devices. Thus, a consumer may keep the application turned off if the consumer does not wish to receive any incentives.

Alternatively, the consumer may wish to receive all available incentives that may be submitted by merchants. Thus, the consumer may turn his or her application on and receive all such submitted incentives. Alternatively, the consumer may define that he or she only wishes to receive certain predefined incentives. Specifically, the consumer may define that he or she wishes only to receive incentives from merchants based on type of store. For example, a consumer may only be interested at a given time to receive incentives from merchants where the store is a restaurant. Therefore, the consumer may define that he or she wishes to receive incentives only from restaurants.

Moreover, the consumer may wish to receive incentives that are of a certain quality. For example, the quality of the incentive may be based on the amount of the discount and/or a value of the discount. Thus, a consumer may wish to receive only incentives that are qualitatively rated higher than others. Specifically, the consumer may wish to receive merely "good" to "excellent" incentives. The quality of the incentives may be determined based on a quality indicator algorithm that may rate the incentive based on one or more criteria, as detailed below.

Alternatively, the consumer may wish to receive incentives based on geographical location. For example, a consumer may define that he or she only wishes to receive incentives if the incentives are to go to stores within a certain geographical area. Specifically, the consumer may no desire to receive incentives that are more than 20 miles away, for example, because he or she may have no desire to travel for more than 20 miles to redeem an incentive at a store.

Finally, the consumer may combine the limitations on incentives based on any combination of the type of the store, the quality of the incentive and/or the geographical location of the store.

When presented with an incentive that the consumer wishes to utilize, he or she may be presented with an option to "accept" the incentive, via step 28. As noted above, in a preferred embodiment of the present invention, the consumer may be presented with the incentive and may be provided a very short time frame to accept the incentive, such as instantaneously or nearly instantaneously. Once the consumer accepts the incentive, the consumer may receive information relating to the incentive, such as a unique code, a symbol, such as a machine readable code, such as a QR code, or other like information, that the consumer may take to the store and redeem. Thus, the incentive and/or information that may be accepted by the consumer, may be stored on his or her portable electronic device via step 30, and redeemed at the merchant's store via step 32. To redeem the incentive, the consumer may show the incentive, the code associated with the incentive, or any other information received about the incentive. For example, the merchant may have a bar code reader and the unique code or symbol may be a bar code. The consumer may show the bar code, which may have been stored on the consumer's portable electronic device and displayed on the screen of the device, to the merchant, and the merchant may scan the bar code, redeeming the incentive.

In an example of the systems and methods of the present invention, the present invention may be utilized by both a merchant and a consumer via the merchant or consumer's computing device and screen device showing a series of screen shots providing functionality for both the merchant and the consumer. The systems and methods of the present invention may be useful from a merchant side to create, define and distribute incentives, in embodiments of the present invention. In an example of the present invention, advantages may include, specifically, that the incentive may be defaulted to "local", meaning the incentive may be originally created to be distributed only to consumers in the merchant's immediate area, but that the merchant may be given more control of targeting specific consumers by "geo-targeting", which is defined herein as defining the consumers to receive incentives based on the consumer's actual geographical locations, vector-based targeting, and/or historical path of travel targeting, at the time the incentive is offered or otherwise distributed.

In a step, a merchant may present security credentials to login to the merchant's account. Alternatively, the merchant may sign up and create an account if new. Setup options may be presented for new merchants. For example, the merchant may utilize existing websites and/or databases containing business-specific information to automatically provide information concerning the merchant to the system of the present invention. For example, the website Yelp may keep information relating to a business, and the merchant may simply enter a Yelp ID to the system of the present invention, whereby the merchant's information may be copied from Yelp and entered into the account information of the system of the present invention. Alternatively, the merchant may set up an account manually. Information may be entered by a merchant manually to set up an account. Specifically, the metropolitan area in which the business is located may be designated, as well as the type of business. Moreover, payment information may be entered, as well as integration of the systems and methods of the present invention with social media websites and platforms, including, for example, Facebook and/or Twitter, to provide enhanced ability for the merchant to market itself and utilize the system on the Facebook and Twitter platforms. Terms and conditions may be shown to the merchant, and accepted by the merchant. A merchant may obtain help if the merchant has trouble logging in.

An option may be provided to a merchant for turning an incentive "on" and offering the incentive to consumers. Specifically, an incentive may have already been created that is defined as "30% off/4 ppl max", which means that a consumer may use the incentive to purchase goods at, for example, a restaurant or other store, where the consumer may get 30% off his or her entire bill, but with a maximum of 4 people on one ticket to obtain the 30% discount. As noted, a merchant may turn the incentive on manually. This may be useful when the "time mode" for the incentive is not automatic so that the merchant has complete control over when the incentive is offered or otherwise distributed. Moreover, a number of the incentive may have been claimed by consumers such as, for example: "33 issued in the last 45 minutes", which provides the merchant the ability to determine how many incentives have been claimed, and thus the merchant may know when to turn "off" the distribution of the incentives. Of course, the merchant may turn off the incentive for any other reason.

An incentive used by a merchant may be defined as automatically turning "on" during predefined time periods. Specifically, the incentive may, in a non-limiting example, automatically turn on at 5 pm and turn off at 7 pm from Monday to Friday. An option may be presented for the merchant to change the automatic time settings. Moreover, an option may be presented allowing the merchant to turn the incentive on manually, which may be useful if the merchant wishes to offer or otherwise distribute the incentive outside the times defined for turning the incentive on automatically.

Again, a merchant may determine how many incentives have been claimed by consumers since the systems and methods of the present invention may track that information. As noted, in the non-limiting example, the incentive may be scheduled to be deactivated at 7 pm. However, the merchant may be provided a manual means of deactivating the incentive, such as if a particular number of incentives have already been claimed by consumers. Moreover, the merchant may define that the incentive be deactivated not only when the defined time has elapsed, but if a defined number of incentives have been claimed by consumers, even if prior to the elapsed time period. A merchant may have the ability to deactivate an incentive when the incentive has no time of deactivation defined. Thus, a merchant may simply select the option to deactivate the incentive when desired by the merchant, such as after a certain number of incentives have been claimed by consumers, or after an amount of time has elapsed, determined by the merchant.

A merchant may utilize scanning technology to scan a code that has been given to a consumer when the consumer has claimed an incentive. As noted earlier, once a consumer claims an incentive that has been sent to the consumer, he or she may be given and may store a unique identifier, such as a bar code, or other like code that may be scanned by scanning equipment. For example, the bar code may be stored on the consumer's portable electronic device and displayed on the screen of the portable electronic device, such as his or her cellular telephone, when redeeming at the merchant. Alternatively, the code may be entered manually, if the scanning technology fails to work properly, or if the merchant does not have the scanning technology.

A merchant may track statistics relating to incentives. For example, a plurality of incentives (called "Promos" in a non-limiting example) may be defined by a merchant. Each of the promos may be listed in the statistics so that the merchant may see how each incentive works in practice, and may compare each promo to each other. Specifically, the incentives may be tracked by incentives (coupons) issued, incentives redeemed, total customers, and cost per customer. In the exemplary system and methodology described herein, a merchant may pay a fee for each incentive claimed by a consumer. Of course, any other method of payment may be devised as apparent to one of ordinary skill in the art.

Another incentive, besides a coupon offering a certain percentage off of goods and/or services, may be provided. For example, instead of offering discounts on goods and/or services, a merchant may sell vouchers to consumers that may be redeemable at particular times. Generally, a voucher may be defined as an incentive having a fixed value, whereby a consumer may purchase the voucher either at its full value or a discounted value, and utilize the voucher at the merchant's store at a later date or time. To utilize the voucher as an incentive, for purposes of the present invention, a voucher may be purchased and a time limitation may be placed on the voucher. For example, a voucher may be purchased by a consumer at face value, or preferably, at a discounted value, and the voucher may be required to be utilized within a relatively short time period, such as within two hours or a day after the purchase of the voucher. Alternatively, the voucher may have a time limit placed on the voucher, such as that the voucher may only be used during particular days and/or times. Moreover, the voucher, as with any other incentive offered by a merchant utilizing the present invention, may be offered discriminately to potential consumers based on their geographic location. For example, a theater may offer a voucher to a potential consumer for a performance, but only to consumers located in a specific geographic location, such as in a particular neighborhood, or within a certain distance of the theater. Alternatively, the voucher may be offered to a potential consumer based on vector-based targeting and/or historical path-based targeting.

A merchant may manage incentives for a particular store. Specifically, in a non-limiting example, four incentives may be defined by a merchant, although any number of incentives may be defined by the merchants as apparent to one of ordinary skill in the art. For example, a first incentive may be defined as a 30% discount and may be specified as being automatically turned on. A second incentive may be defined as being currently active, meaning that the incentive is currently offered and/or being distributed to consumers. Other incentives may have other defined deals and limitations, but may be currently inactive. The merchant may have the option of selecting a particular incentive for distribution at any particular time. For example, an incentive may be automatically activated, but the merchant may control whether to deactivate that incentive and/or activate another incentive. The manager may also choose to add another incentive, and may define the specific terms of the new incentive. Of course, multiple incentives may be turned on during any time period.

Of course, a merchant the ability to define a new incentive. As part of the system and methodology of the present invention, the merchant may have a plurality of stores that may be managed, and an incentive may be defined for a particular location or multiple locations. Thus, the terms of the incentive may be changed, such as the value of the incentive ("Spotlight Value"); the location's to which the incentive may be applicable ("Select Shop locations"); whether the incentive is automatically activated or manually activated ("Automatic Timer ON/OFF (default is off)"), and where to distribute the incentive, ("Geotargeting").

In non-limiting example, a plurality of different incentives may be offered by a merchant. Specifically, an incentive may be called "Weekday Lunch" having a value of a "30% discount, 4 ppl max". Another incentive may be called "Weekday Dinner" having a value of a "40% discount, 4 ppl max". Moreover, another incentive may be called "Weekend" having a value of "50% discount, 4 ppl max". Helpful hints may be provided to the merchant based on the value of the incentive and/or the timing of the incentive in order for the merchant to quickly remember the details of the incentives.

A merchant may be provided with options for setting a value and other terms for a percentage discount. Specifically, an option may be presented to the merchant to select the percent discount. Preferably, the discount percent may have a minimum and/or maximum cap, such as between 30% and 90%. Another option a merchant may select is how many incentives may be issued, such that when the defined number of incentives has been accepted by consumers, the incentive automatically turns off. Finally, an option may be presented allowing a merchant to select a limit on the number of guests allowed per incentive. Default numbers may be included if a merchant does not explicitly select.

Alternatively, a merchant may select a fixed discount incentive, allowing a merchant to select the value of the fixed discount ($ off entire bill); a minimum bill amount (if any), and whether to automatically disable the incentive after a certain number of incentives have been accepted by consumers. An option may be provided for a merchant to define terms for vouchers that may be issued, such as the voucher face value, the voucher sale value, the maximum number of vouchers that may be accepted by consumers, and a redemption period that the voucher must be used by to remain redeemable.

A merchant, when creating and/or editing an incentive, may select the store locations at which the incentive may be applicable. In a non-limiting example, the merchant may have two store locations. Thus, the merchant may be provided an option to allow the incentive to be redeemable at one of the stores, or both of the stores. The merchant may further define that the incentive may be redeemable at all, one or some fraction of the total number of stores of the merchant.

Options may be provided to a merchant for setting time limitations for turning on and/or off the incentives. Specifically, the merchant may select whether the incentive automatically turns on and off, or whether it is to remain manual. If automatic, then the merchant may define at what times and/or on what days the incentive may automatically be turned on and/or off. Multiple days may be selected, and different times or multiple blocks of times may be selected for each day.

Options may be presented to a merchant for setting geotargeting limitations on an incentive defined by the merchant. Specifically, a merchant may have an option to define no geographical restrictions when the incentive is distributed, meaning it will be sent to all consumers regardless of their particular geographical location at the time the incentive is distributed (i.e., "pushed") by the merchant or requested (i.e., "pulled") by the consumer, as will be described in more detail below. The merchant may set the geographical limitations by specifying that the incentive may only be distributed to consumers that are within a certain distance from the store. Preferably, the geotargeting will not distribute incentives to those consumers that are already within the store, based on where their portable electronic devices are located. Specifically, a merchant may set a "donut-shaped" geographical configuration, allowing the "hole" of the donut to be defined as the store location, and the target of consumers to receive the incentive to be located a certain distance from the store. Preferably, the geotargeting limitations may be defined by distance from the merchant's store, although any other way of geographically targeting consumers may be utilized, such as by defining applicable neighborhoods, towns, and other like geographical ways of defining consumer's locations. Moreover, the merchant may opt to define the incentive based on vector-based targeting of consumers (their present path of travel) and/or consumers' historical paths of travel.

A single incentive may be tiered, such that consumers that are in different geographical locations may be offered different incentives. Alternatively, a plurality of incentives may be defined whereby consumers in different geographical locations are offered different discounts. For example, one or more incentives may be defined whereby consumers within 0-5 miles of the store (but not presently within the store) are offered a 30% discount, but consumers 5-10 miles from the store are offered 40% discounts. Each of the incentives may be turned on or off, either together or separately, as desired by the merchant.

A merchant may be presented with options to define the merchant's account to set certain parameters and/or track certain information. Specifically, if the merchant selects "Notifications," the merchant may be presented with the ability to receive certain notification upon certain occurrences. The merchant may set that he or she may be notified when an incentive code is "redeemed" (i.e., when the incentive is brought to the store and used) and/or whether the incentive is issued (i.e., when the incentive is sent and claimed by a consumer). Moreover, an e-mail or other address may be entered for notification when an incentive is redeemed and/or issued. This may allow a merchant to have immediate notification and tracking ability of incentives. Options may be provided to a merchant for setting whether a merchant may be notified upon the redemption and/or issuance of incentives consisting of promotions (such as discounts) and/or vouchers.

Other options may be presented to merchants to define one or more businesses or stores that may issue incentives pursuant to the present invention. Specifically, a default setting may be that only a single business or store is definable. Information may be entered into the system regarding editing an existing single or first business or store, such as a name, nickname, address, phone number, email address, home page, a brief description about the business, hours of operation, and a business location market that the business or store services. A merchant may add or select a photograph that may be used in conjunction with the business information. Of course, any other information may be provided and entered by a merchant concerning one or more stores managed by the merchant. The photograph or other information may be presented to a consumer when incentives are offered or otherwise distributed by the merchant to the consumer to provide information to the consumer about the merchant and/or the store or stores.

After a merchant distributes an incentive, and a consumer claims the incentive, the consumer may physically enter the store and use the incentive by redeeming the same. The incentive may be in the form of a machine readable code that may be scanned by the merchant using scanning equipment, as described above. Alternatively, an identification number or code for the incentive may be manually entered, which may display the value and time limitations of the incentive. If the incentive is outdated or expired, then the incentive may be rejected. Moreover, if the number of people applicable to an incentive is specified as a limitation, the number of people in the party may be entered and submitted.

A consumer may, therefore, receive incentives defined by the merchant. Specifically, a consumer may search for and/or otherwise receive, and claim or otherwise accept incentives that may be distributed from a merchant, in an embodiment of the present invention. As noted above, the consumer may utilize the systems and methodology of the present invention using any electronic computing device. Preferably, the consumer utilizes the system and methodology described herein on a mobile device, such as a cellular telephone, a smart phone, such as an iPhone, and Android, a Windows phone, or other mobile device, whereby the consumer may receive the incentives provided by merchants and respond accordingly, as described herein.

In a preferred embodiment of the present invention, a consumer may download the present invention or a component thereof as an application on the consumer's portable electronic device. As noted, a consumer may obtain access to incentives from consumers in real time as the incentives are distributed from the merchants. Typically, the incentives may be received in, generally, two ways. First, the merchant may send a signal that may be received by consumers that have accessibility to the system and methodology provided herein. Alternatively, the customer may request incentives from the system of the present invention and receive all applicable incentives that may fit criteria established by the consumer. In either case, the merchant may send out incentives repeatedly within the time period specified by the merchant. For example, the merchant may send out an incentive every 15 minutes for reception by applicable consumers. Alternatively, consumers may request applicable incentives repeatedly and at various times. For example, a consumer may activate his or her application on his or her portable electronic device, which may request all applicable incentives available every 15 minutes.

A consumer may "sign in" or "sign up" for the service, as described herein. If the consumer has already downloaded the application or otherwise obtained access to the system of the present invention, such as via the Internet, and if the consumer has already signed up for an account, the consumer may simply sign in and present security credentials. Preferably, the new account sign up may request the mobile phone number or another way to track the geographical location of the portable electronic device, either via cellular towers, GPS, or other like technology. Alternatively, tracking information that may be utilized by the system of the present invention as described herein may be presented by the consumer at a later time. The information provided to the system of the present invention may allow the system of the present invention to track the location of the mobile phone or other electronic device.

Several incentives may be received by the consumer, accepted by the consumer, and saved by the consumer on his or her portable electronic device. In some cases, the incentive may be expired, and the expiration thereof may be communicated to the consumer. Alternatively, the incentive may be shown to have been redeemed. A consumer may be provided with information regarding definitional issues as the consumer uses the application, such as, for example, what the difference may be between a promo (such as a discount incentive) and a voucher (requiring payment by the consumer).

Generally, in a preferred embodiment of the present invention, the incentive may be presented to the consumer if the consumer satisfies the geographical limitation, if any, that may be placed on the incentive by the merchant. For example, specific information about the incentive may be provided to the consumer, such as the value of the incentive and to where it is redeemable, location information about the store and how far away the store may be. In a preferred embodiment, the consumer may be required to accept the incentive at the time of receiving the incentive or very soon thereafter. Indeed, a typical incentive provided by the present invention may expire soon after being received, and a consumer, to utilize the incentive at the merchant, may need to use the incentive soon after receipt and acceptance. However, the system may provide the consumer with a time limit to accept the incentive.

Preferably, when a consumer wishes to claim or accept an incentive, the consumer may be presented with options that may be satisfied before receiving the incentive. Specifically, the system and methodology of the present invention may show a short advertisement that the consumer must view prior to receiving the identification code of the incentive. Alternatively, the consumer may skip viewing the advertisement if the consumer agrees to allow advertising or other information relating to the merchant or to the deal that had been accepted by the merchant, to be placed on the consumer's social media page, such as the consumer's Facebook wall or to be tweeted using twitter. In an alternative embodiment, the incentive may be provided with the payment of a fee, or for nothing.

In a preferred embodiment, merchants may pay for utilizing the system and methodology, as described herein, when an incentive is accepted by a consumer. Of course, any other model for providing payment for use of the system and methodology described herein may be utilized, such as via a monthly fee. However, by paying for each incentive that may be claimed by a consumer, the cost of using the system is tied directly to the success of utilizing the system and methodology. In addition, by requiring a consumer to view a short advertisement, for example, the merchant may have more confidence that the consumer will actually redeem the incentive and visit the merchant's store.

Once the incentive is accepted by the consumer, and after the consumer "pays" for the incentive, either via a monetary payment or views the advertisement and/or allows advertising or other information on the consumer's social media page, as described above, the details relating to the incentive may be provided to the consumer. Specifically, information about the incentive may be provided, a code may be provided, whether machine readable or manually enterable and expiration information concerning the incentive may be provided.

Account information options may be presented to the consumer. For example, a profile may be created or edited, payment information may be created or edited, and deal alert settings may be created or edited. Specifically, a username, email address, password, photograph, age, gender, general location information, such as a zip code, or any other information, may be entered into the consumer's profile. Moreover, an option to autosave claimed incentives may be selected by the consumer. A photograph may be uploaded.

Payment information may be provided by a consumer. Specifically, credit card information or other payment information may be entered so that the consumer may be able to purchase vouchers or other incentives that may require payment at the time of acceptance. Thus, when a voucher is accepted by a consumer, the consumer may process payment automatically, or may have choices to select how to pay for the voucher.

Settings may be changed relating to filters consumers may place on incentives that may be received or otherwise receivable from merchants. Specifically, a consumer may define no filters, and may receive all deals that a consumer may be eligible to receive based on his or her geographical location. Alternatively, the consumer may receive only deals that are rated based on one or more quantitative and/or qualitative criteria. Thus, only "Very Good Deals" or "Insane Deals" may be selected, and the consumer may receive and see only deals that are rated as either of those categories. Thus, even if a consumer is geographically eligible to receive an incentive based on his or her geographical location defined by the merchant, the consumer may set the application to only show incentives rated relatively high.

In a preferred embodiment of the present invention, the rating of the incentives may be done so that a consumer may have a standardized way of determining which incentives may be better than other incentives. It may be particular difficult to objectively rate and/or rank incentives if some incentives relate to absolute values and other incentives relate to percentages discounted. To this end, an incentive or deal score may be generated based on information about the incentive or information about the incentive that may be input into a scoring algorithm to normalize the scores. Once scored, incentives may be directly compared to each other to determine whether an incentive may be better or worse than any other incentive, or may be utilized to filter the incentives for view by the consumer based on the generated scores.

To rate and compare incentives that may be different values, the following scoring system and methodology may be utilized. Specifically, in a preferred embodiment, if the incentive is a straight percentage discount from a bill or invoice, then the score may simply be the number of the percentage. Thus, if an incentive is 25% off a consumer's bill or invoice, the incentive may receive a score of 25. Alternatively, if the incentive is based on a fixed value off of a total bill or invoice, then an incentive score may be calculate as follows. First, a maximum raw score is generated based on the dollar value as a percentage of the minimum applicable bill. For example, if the value of the incentive is $5 off a bill that is $10 or more, the maximum percentage value for that incentive may be 50%. To compare this incentive to a percentage discount, however, the absolute value of the discount may be considered. Thus, because the absolute value of an incentive that is $5 off a bill of $10 or more is only $5, the raw score may be reduced by a reducing factor. The reducing factor may be a percentage reduction off the total raw value. In a preferred embodiment, the following Table 1 may be utilized to determine the percentage reduction off the total raw value to determine the final incentive score:

TABLE 1

| $ Amount of Discount | Percent reduction from raw score |
|---|---|
| $30 | 0 |
| $25 | 10 |

TABLE 1-continued

| $ Amount of Discount | Percent reduction from raw score |
|---|---|
| $20 | 20 |
| $17 | 22 |
| $15 | 25 |
| $14 | 30 |
| $13 | 35 |
| $12 | 40 |
| $11 | 50 |
| $10 | 55 |
| $9 | 65 |
| $8 | 70 |
| $7 | 75 |
| $6 | 80 |
| $5 | 85 |
| $4 or less | 90 |

Thus, for an incentive that is $5 off a bill that is $10 or more, the raw score would be 50, which would have to be reduced by 85% of the raw score, pursuant to the table above. The incentive would thus have a final score of 7.5 (50−0.85(50)=7.5). Of course, any other method for rating, ranking and/or comparing deals may be utilized and presented to consumers.

Utilizing the method described above for rating the respective incentives, the following incentives may be scored as follows. First, Deal 1 may be an incentive that is 30% off a bill or invoice would be given a score of 30. Deal 2 may be an incentive that is $5 off a bill that is $10 or more would be rated 7.5. And Deal 3 may be an incentive that is $15 off a check of $30 or more would be rated 37.5 (50−0.35(50)=37.5. The order of ranking of incentives, from best to worst would be Deal 3, Deal 1, and Deal 2. The rating system utilized herein may be utilized by a consumer to define that only deals of a certain rating are presented to the consumer for viewing. Alternatively, deals may be rated and ranked to provide a manner of comparing incentives together.

The incentives may further be filtered based on the type of merchant sending the incentive. Specifically, the consumer may filter incentives based on whether the incentive is from restaurants, spas, and/or activities. Of course, any other type of store may be represented and the invention should not be limited as presented herein.

Moreover, the incentives that may be received and seen by a consumer may be ranked by predefined criteria. Specifically, the incentives received, seen and available to a consumer may be sorted based on qualitative criteria, such as sorted from best to worst. Alternatively, the incentives received, seen and available to a consumer may be sorted by the geographical distance from the consumer's present geographical location to the stores represented by the incentives. Moreover, incentives may be sorted and shown to a consumer based on both a qualitative rating and a distance. Alternatively, the consumer may wish to see only incentives that may be a certain distance from the consumer's present position. Thus, the incentives may be sorted and only those fitting the geographical limitation set by the consumer may be shown, and may be sorted pursuant to the best to the worst. For example, incentives may be sorted based on their geographical location to the consumer's present position.

In addition, stores related to the incentives received by the consumer may be shown on a map whereby the consumer may graphically see the distance between the consumer's present position and the stores represented by the received incentives. The consumer may filter the incentives presented graphically on a map by the type of business, such as restaurants, drinks, spas, activity, fitness, or any other type of business that may be represented in the system and methodology of the present invention. Of course, any other way of ranking, sorting and/or showing incentives may be provided, and the invention should not be limited as described herein.

Specific information relating to an incentive may be available to the consumer. Specifically, information about the incentive, such as the value of the incentive, the expiration date or time of the incentive, information about the store, such as its location, and other information may be presented to the consumer. An option for getting or accepting the incentive may be provided. If a deal is a certain age, such as more than 15 minutes old, the application may present this information to the consumer, and ask the consumer whether the consumer wishes to see if fresher and/or possibly better deals may be available. Once the consumer opts to accept the incentive, an advertisement may be presented for viewing by the consumer, or the consumer may opt to skip the advertisement if the consumer agrees to post advertisement information on his or her Facebook wall or via twitter. A coupon code may be provided to the consumer, whereby information relating to the incentive may be received by the consumer for redemption at the store of the merchant whose incentive the consumer accepted. Specifically, a coupon code, a machine readable "QR" code, and expiry information, as well as any other information and/or limitation, may be presented. An option to save the incentive may also be presented to the consumer so that the consumer may retrieve the incentive at a later time for redemption at the merchant's store.

The system and methodology of the present invention, as described herein, may have other features. For example, the present invention may allow a merchant to provide certain discounts based on vector-based targeting, historical location information of consumers, or may provide loyalty discounts to consumers that tend to utilize the present invention often at the merchant. Specifically, a merchant may be interested in defining special incentives to consumers that may spend much of their time within a certain location, or within a specific distance from the merchant's store. For example, a merchant may wish to reward customers that can demonstrate that they reside or otherwise spend much of their time within 5 miles of the merchant's store.

Thus, the tracking information that may be generated by the present invention in determining the present location of consumers may be utilized to determine whether a consumer matches the criteria that a merchant defines for providing the special discount. For example, a merchant may wish to provide a special discount to "local" consumers that spend much of their time within 5 miles of the store. Therefore, the merchant may specify that a consumer may be defined as "local" if, when utilizing the present invention, the tracking information indicates that the consumer has spent half or more of their time over a period of time within 5 miles of the store. Thus, the present invention may identify all consumers that fit the defined criterion, and provide the information to the merchant, or allow the merchants to offer these consumers special incentives. The tracking information relating to consumers, as well as any other information generated and saved by the present invention may be utilized for any other purpose, as apparent to one of ordinary skill in the art.

Moreover, a consumer that claims a certain threshold number of incentives offered by a merchant may qualify for the merchant's loyalty program, whereby the merchant may offer special incentives to those particular consumers that satisfy the threshold defined by the merchant. For example, if, over a certain defined period of time, a consumer accepts and redeems a certain number of incentives, the merchant may provide, points that may be redeemable, a specific incentive or other reward to the consumer. Of course, the merchant may define any other manner of reward loyal customers utilizing information generated by the present invention.

In addition, the present invention may offer loyalty or reward programs for consumers and/or merchants that utilize the system. For example, the present invention may offer an incentive or reward to a merchant that utilizes the system to send a threshold amount of incentives. Alternatively, a consumer may be rewarded by the present invention for accepting certain number of incentives. Moreover, a consumer may be rewarded for informing others about the system and methodology of the present invention and having the others sign up as customers thereof. Alternatively, the consumer may be rewarded by points or via any other manner if they utilize an incentive to bring more people into a store to utilize an incentive claimed by the consumer.

EXAMPLES

In a preferred example of the present invention, a merchant may note that his or her store is currently having an unanticipated low demand period, yet may have goods having relatively short shelf-lives having relatively high fixed costs and relatively low marginal costs associated therewith. Thus, a merchant may login into the present invention and define an incentive. Specifically, the merchant may define a discount and the number of people the discount may be applicable to in a single party or on a single ticket, and an expiration time for the incentive. For example, the merchant may specify that the incentive expires within 45 minutes from acceptance of the incentive by a consumer. Moreover, the incentive may be required to be accepted instantaneously or nearly instantaneously upon receipt thereof by the consumer. The merchant may also place a geographical limitation on the incentive, such as, for example, that the incentive is to be distributed only to consumers that are 5 miles or more from the restaurant, hoping to attract consumers that may not know about the restaurant because they are further away from the restaurant. Once activated, the incentive may be broadcast or otherwise sent to all consumers within the geographical area. The merchant may track how many incentives are claimed by consumers and may manually deactivate the incentive after a certain number of incentives are accepted by consumers. Thus, the merchant may drive consumers to his or her store almost immediately upon recognizing an unanticipated low demand period.

Alternatively, a merchant may know, based on historical data, that Mondays and Wednesdays from 4:00 to 6:00 are typically low demand periods. Thus, the merchant may define an incentive of a discount and define that the discount be redeemable within 1 hour of acceptance of the incentive, and may activate the incentive to be broadcast or otherwise distributed to consumers automatically starting at 3:00 pm and automatically deactivating either at the time of acceptance of a certain number of incentives by consumers, or at 5:00 pm, whichever occurs first. Thus, the merchant may drive consumers to his or her store during routinely low demand periods on Mondays and Wednesdays.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A method of providing an incentive to a consumer from a merchant for a good or service provided by the merchant and adapted to be purchased by the consumer, comprising the steps of:
   providing a merchant electronic computing device in connection with the Internet;
   defining a first geographic region and a second geographic region with the merchant electronic computing device, the second geographic region being within the first geographic region,
   tracking a location of at least one consumer, the at least one consumer having a mobile device that is connected to a mobile network and has geographical location tracking means, wherein the location of the at least one consumer is tracked via the geographical location tracking means of the at least one consumers mobile device, and
   defining an incentive using the merchant electronic computing device, the incentive including a value and an expiry, wherein the incentive expires within approximately two hours;
   activating the incentive by the merchant using the merchant electronic computing device, wherein activating the incentive causes the incentive and a visual element of an acceptance option to be displayed on the screen of the mobile device that is connected to the mobile network if, in tracking the mobile device, the mobile device is located within the first geographic region and not within the second geographic region;
   wherein said incentive is configured to be accepted by the at least one consumer when the at least one consumer selects the visual element of the acceptance option displayed on the screen of the mobile device;
   sending an acceptance notification from the mobile device to the merchant electronic computing device when said acceptance option is selected by the at least one consumer, further wherein notification of the at least one consumer's acceptance of said incentive having an expiration within approximately two hours provides the merchant knowledge that the at least one consumer intends to travel to the merchant within approximately two hours;
   sending an acceptance voucher from the merchant electronic computing device to the mobile device and displaying the acceptance voucher on the screen of the mobile device when the acceptance option is selected by the at least one consumer, said acceptance voucher redeemable at the merchant for the good or service of the merchant for the value of the incentive prior to the expiry of the incentive by physically presenting the acceptance voucher shown on the screen of the mobile device; and
   deactivating the incentive at the server using the merchant electronic computing device wherein deactivating the incentive causes a change to the incentive on the display of the mobile device to indicate that the incentive is inactive.

2. The method of claim 1 wherein the value of the incentive is a percentage discount on the merchant's goods or services.

3. The method of claim 1 wherein the value of the incentive is a set monetary amount discount on the merchant's goods or services.

4. The method of claim 1 further comprising the step of:
   defining a third geographic region with the merchant electronic computing device, wherein the visual representation of the incentive is not displayed on the mobile device if the mobile device is in the third geographic region.

5. The method of claim 1 further comprising the step of:
   defining a first portion of the first geographic region with the merchant electronic computing device, wherein the visual representation of the incentive is not displayed on the mobile device if the mobile device is in the first portion of the first geographic region; and
   defining a second portion of the second geographic region with the merchant electronic computing device, wherein the visual representation of the incentive is displayed on the mobile device if the mobile device is in the second portion of the second geographic region.

6. The method of claim 1 further comprising the step of:
   defining a direction of travel with the merchant electronic computing device; and
   displaying the visual representation of the incentive on the mobile device if the mobile device has the defined direction of travel.

7. The method of claim 6 wherein the visual representation of the incentive is displayed on the mobile device of at least one consumer having a direction of travel matching the defined direction of travel at the time the incentive is activated.

8. The method of claim 7 wherein the visual representation of the incentive is not displayed on the mobile device if the mobile device has a direction of travel that does not match the defined direction of travel after the incentive is activated.

9. The method of claim 1 wherein the incentive further comprises a time of distribution defined by the merchant via the merchant electronic computing device, wherein the incentive is automatically activated at the time of distribution defined in the incentive.

10. A method of receiving an incentive defined by a merchant comprising the steps of:
    providing an electronic mobile device of a consumer;
    providing a computing device, the computing device programmed to:
      receive input from the merchant defining a first geographic region and a second geographic region, the second geographic region being within the first geographic region,
      track a location of the mobile device of the consumer, the mobile device connected to a mobile network and having geographical location tracking means, wherein tracking the mobile device is done via the geographical location tracking means of the mobile device, and
      send a visual representation of an incentive and an acceptance option from the computing device for display on the mobile device whose present location is within the first geographic region and not within the second geographic region;
    displaying, on a screen of the mobile device, the visual representation of the incentive activated by a merchant and the acceptance option if the mobile device, tracked by the server, is in the first geographic region but not the second geographic region, wherein the visual representation of the incentive has a value discount defined therein, a time expiry expiring within a short time period defined therein, and an acceptance option;

accepting the incentive using the mobile device by selecting the acceptance option, wherein acceptance of the incentive causes a notice to be sent from the mobile device to the computing device notifying the merchant of the acceptance, wherein notification of the at least one consumer's acceptance of said incentive having an expiry expiring within a short time period provides the merchant knowledge that the at least one consumer intends to travel to the merchant within the short time period;

receiving an acceptance voucher at the mobile device and displaying the acceptance voucher on the display of the mobile device when the acceptance option is selected by the consumer;

displaying the acceptance voucher on the screen of the mobile device at the merchant for the good or service of the merchant for the value of the incentive prior to the expiry of the incentive by physically presenting the acceptance voucher shown on the screen of the mobile device to the merchant.

11. The method of claim 10 wherein the computing device further comprises vector-based direction of travel information defined therein, wherein displaying the incentive from the merchant is displayable on the electronic device when the vector-based direction of travel information matches the direction of travel of the electronic device.

12. The method of claim 10 wherein the incentive comprises a percentage discount on the merchant's goods or services.

13. The method of claim 10 wherein the incentive comprises a set value discount on the merchant's goods or services.

14. The method of claim 10 further comprising the step of:
periodically updating the visual representation of the incentive on the display of the mobile device.

15. The method of claim 10 further comprising the step of:
displaying, on the mobile device, a plurality of incentives activated by one or more merchants, each of the plurality of incentives having geographic location information defined therein, wherein the plurality of incentives are displayable on the mobile device when the present location of the mobile device matches the geographic location information of each of the incentives.

16. The method of claim 10 further comprising the step of:
receiving a machine readable code and displaying the machine readable code with the acceptance voucher on the display of the mobile device, wherein the machine readable code is scanned at the merchant for redeeming the incentive.

17. The method of claim 1 wherein the incentive is automatically deactivated when a number of consumers, predefined by the merchant at the server, accept the incentive.

18. The method of claim 1 wherein the merchant manually deactivates the incentive at the server.

19. The method of claim 10 wherein the incentive has a quality rating designation, and further comprising the step of:
setting a filter via the mobile device to display on the mobile device only incentives that have a specific quality rating designation; and
displaying the visual representation of the incentive on the mobile device if the quality rating designation of the incentive matches the specific quality rating designation set.

20. The method of claim 10 wherein the incentive has a type designation, and further comprising the steps of:
setting a filter via the mobile device to display on the mobile device only incentives that have a specific type designation; and
displaying the visual representation of the incentive on the mobile device if the type designation of the incentive matches the specific type designation set.

21. The method of claim 10 wherein the merchant has a type designation, and further comprising the steps of:
setting a filter via the mobile device to display on the mobile device incentives from specific types of merchants; and
displaying the visual representation of the incentive on the mobile device if the type of merchant indicated on the incentive matches the specific types of merchants set.

22. The method of claim 10 wherein the merchant has a location designation, and further comprising the steps of:
setting a filter via the mobile device to display on the mobile device incentives from merchants having a specific location designation; and
displaying the visual representation of the incentive on the mobile device if the location designation of the merchant matches the specific location designation set.

23. The method of claim 10, wherein the incentive comprises a code uniquely identifying the incentive presented on the consumer's mobile device display as the visual representation of the incentive.

* * * * *